US010642837B2

(12) United States Patent
Umamageswaran et al.

(10) Patent No.: US 10,642,837 B2
(45) Date of Patent: May 5, 2020

(54) RELOCATING DERIVED CACHE DURING DATA REBALANCE TO MAINTAIN APPLICATION PERFORMANCE

(71) Applicant: Oracle International Corporation, Redwood Shores, CA (US)

(72) Inventors: Kothanda Umamageswaran, Sunnyvale, CA (US); Krishnan Meiyyappan, Fremont, CA (US); Adrian Tsz Him Ng, Redwood City, CA (US); Vijay Sridharan, Santa Clara, CA (US); Wei Zhang, Foster City, CA (US); Ke Hu, Foster City, CA (US); Xin Zeng, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 189 days.

(21) Appl. No.: 15/410,496

(22) Filed: Jan. 19, 2017

(65) Prior Publication Data
US 2017/0206199 A1    Jul. 20, 2017

Related U.S. Application Data

(60) Provisional application No. 62/280,862, filed on Jan. 20, 2016.

(51) Int. Cl.
G06F 16/27       (2019.01)
G06F 16/2455     (2019.01)

(52) U.S. Cl.
CPC ........ G06F 16/24552 (2019.01); G06F 16/27 (2019.01)

(58) Field of Classification Search
None
See application file for complete search history.

(56) References Cited

U.S. PATENT DOCUMENTS 4,425,615 A    1/1984  Swenson et al.
4,782,325 A    11/1988 Jeppsson et al.
(Continued)

FOREIGN PATENT DOCUMENTS

CN    101150483 A    3/2008
EP    2 608 070 A1   6/2013
(Continued)

OTHER PUBLICATIONS

Thanh Hung; "New Objective Function for Vertical Partitioning in Database System"; 2008; Processing of the Spring Young Researcher's Colloquium on Database and Information Systems SYrCoDIS (Year: 2008).*

(Continued)

*Primary Examiner* — Jeff A Burke
*Assistant Examiner* — Jermaine A Mincey
(74) *Attorney, Agent, or Firm* — Hickman Palermo Becker Bingham LLP

(57) ABSTRACT

According to embodiments, a derived cache that is derived from a first instance of particular data is used to speed up queries and other operations over a second instance of the particular data. Traditionally, a DBMS generates and uses derived cache data only for the database data from which the derived data was derived. However, according to embodiments, derived cache data associated with a first instance of database data is relocated to the location of a second, newly created, instance of the database data. Since the derived cache data is derived from an identical copy of the database data, the cache data derived for the first instance can successfully be used to speed up applications running over the second instance of the database data.

14 Claims, 4 Drawing Sheets

(56) References Cited

U.S. PATENT DOCUMENTS

| | | |
|---|---|---|
| 5,255,356 A | 10/1993 | Michelman et al. |
| 5,265,246 A | 11/1993 | Li |
| 5,504,890 A * | 4/1996 | Sanford ............... G06F 16/248 |
| 5,717,893 A | 2/1998 | Mattson |
| 5,742,792 A | 4/1998 | Yanai et al. |
| 5,765,034 A | 6/1998 | Recio |
| 5,778,430 A | 7/1998 | Ish et al. |
| 5,848,408 A | 12/1998 | Jakobsson et al. |
| 5,870,759 A | 2/1999 | Bauer et al. |
| 5,943,689 A | 8/1999 | Tamer |
| 5,987,453 A | 11/1999 | Krishna et al. |
| 5,999,943 A | 12/1999 | Nori et al. |
| 6,009,432 A | 12/1999 | Tarin |
| 6,023,695 A | 2/2000 | Osborn et al. |
| 6,035,306 A | 3/2000 | Lowenthal et al. |
| 6,049,798 A | 4/2000 | Bishop et al. |
| 6,128,621 A | 10/2000 | Weisz |
| 6,457,105 B1 | 9/2002 | Spencer et al. |
| 6,484,179 B1 | 11/2002 | Roccaforte |
| 6,618,729 B1 | 9/2003 | Bhashyam et al. |
| 6,636,870 B2 | 10/2003 | Roccaforte |
| 6,662,174 B2 | 12/2003 | Shah et al. |
| 6,665,684 B2 | 12/2003 | Zait et al. |
| 6,728,823 B1 | 4/2004 | Walker et al. |
| 6,732,115 B2 | 5/2004 | Shah et al. |
| 6,748,394 B2 | 6/2004 | Shah et al. |
| 6,778,996 B2 | 8/2004 | Roccaforte |
| 6,785,666 B1 | 8/2004 | Nareddy et al. |
| 6,804,714 B1 | 10/2004 | Tummalapalli |
| 6,865,575 B1 | 3/2005 | Smith et al. |
| 6,898,608 B2 | 5/2005 | Hopeman et al. |
| 6,920,640 B2 | 7/2005 | Srinivasan et al. |
| 6,922,754 B2 | 7/2005 | Liu et al. |
| 6,928,451 B2 | 8/2005 | Mogi et al. |
| 6,957,222 B1 | 10/2005 | Ramesh |
| 6,973,457 B1 | 12/2005 | Bastawala |
| 7,007,029 B1 | 2/2006 | Chen |
| 7,028,046 B2 | 4/2006 | Anjur et al. |
| 7,031,953 B2 | 4/2006 | Shah et al. |
| 7,031,994 B2 | 4/2006 | Lao et al. |
| 7,047,253 B1 | 5/2006 | Murthy et al. |
| 7,069,324 B1 | 6/2006 | Tiwana et al. |
| 7,072,897 B2 | 7/2006 | Shah et al. |
| 7,076,507 B1 | 7/2006 | Tarin |
| 7,080,090 B2 | 7/2006 | Shah et al. |
| 7,089,331 B1 | 8/2006 | Gollapudi et al. |
| 7,093,162 B2 | 8/2006 | Barga et al. |
| 7,096,224 B2 | 8/2006 | Murthy et al. |
| 7,103,590 B1 | 9/2006 | Murthy et al. |
| 7,113,951 B2 | 11/2006 | Bourekas |
| 7,143,098 B2 | 11/2006 | Chen et al. |
| 7,149,769 B2 | 12/2006 | Lubbers et al. |
| 7,159,076 B2 | 1/2007 | Madter |
| 7,165,144 B2 | 1/2007 | Choubal et al. |
| 7,167,859 B2 | 1/2007 | Shah et al. |
| 7,228,300 B2 | 6/2007 | Lei et al. |
| 7,233,982 B2 | 6/2007 | Chen |
| 7,272,589 B1 | 9/2007 | Guay |
| 7,287,022 B2 | 10/2007 | Netz et al. |
| 7,290,090 B2 | 10/2007 | Madter |
| 7,313,559 B2 | 12/2007 | Netz et al. |
| 7,315,849 B2 | 1/2008 | Bakalash et al. |
| 7,320,001 B1 | 1/2008 | Chen |
| 7,333,982 B2 | 2/2008 | Bakalash et al. |
| 7,366,730 B2 | 4/2008 | Greenfield et al. |
| 7,373,353 B2 | 5/2008 | Adler et al. |
| 7,379,944 B2 | 5/2008 | Adler et al. |
| 7,383,275 B2 | 6/2008 | Chen et al. |
| 7,389,283 B2 | 6/2008 | Adler |
| 7,389,284 B1 | 6/2008 | Surlaker et al. |
| 7,392,248 B2 | 6/2008 | Bakalash et al. |
| 7,346,617 B2 | 8/2008 | Wong |
| 7,415,457 B2 | 8/2008 | Dombroski et al. |
| 7,418,438 B2 | 8/2008 | Gould et al. |
| 7,433,886 B2 | 10/2008 | Rathakrishnan |
| 7,437,372 B2 | 10/2008 | Chen et al. |
| 7,461,147 B1 | 12/2008 | Mowat et al. |
| 7,480,662 B2 | 1/2009 | Postapov et al. |
| 7,480,663 B2 | 1/2009 | Colossi et al. |
| 7,496,589 B1 | 2/2009 | Jain et al. |
| 7,502,894 B2 | 3/2009 | Luo |
| 7,505,888 B2 | 3/2009 | Legault et al. |
| 7,506,103 B2 | 3/2009 | Madter |
| 7,558,779 B2 | 7/2009 | Luo |
| 7,593,955 B2 | 9/2009 | Legault et al. |
| 7,610,300 B2 | 10/2009 | Legault et al. |
| 7,610,351 B1 | 10/2009 | Gollaapudi et al. |
| 7,617,235 B2 | 11/2009 | Srinivasan et al. |
| 7,617,312 B2 | 11/2009 | Tummalapalli |
| 7,636,814 B1 | 12/2009 | Karr et al. |
| 7,657,503 B1 | 2/2010 | Cormode et al. |
| 7,657,516 B2 | 2/2010 | Zaman et al. |
| 7,660,823 B2 | 2/2010 | Clover |
| 7,685,092 B2 | 3/2010 | Reichert et al. |
| 7,689,621 B1 | 3/2010 | Huber et al. |
| 7,707,143 B2 | 4/2010 | Bruce et al. |
| 7,716,167 B2 | 5/2010 | Colossi et al. |
| 7,716,172 B2 | 5/2010 | Anjur et al. |
| 7,765,246 B2 | 7/2010 | Basu et al. |
| 7,769,733 B2 | 8/2010 | Chen et al. |
| 7,774,379 B2 | 8/2010 | Basu et al. |
| 7,779,038 B2 | 8/2010 | Adler et al. |
| 7,814,104 B2 | 10/2010 | Raghavan et al. |
| 7,831,082 B2 | 11/2010 | Adler et al. |
| 7,831,615 B2 | 11/2010 | Bailey et al. |
| 7,836,262 B2 | 11/2010 | Gunna et al. |
| 7,860,891 B2 | 12/2010 | Adler et al. |
| 7,873,664 B2 | 1/2011 | Andersche et al. |
| 7,873,684 B2 | 1/2011 | Sounder et al. |
| 7,890,546 B2 | 2/2011 | Shah et al. |
| 7,895,191 B2 | 2/2011 | Colossi et al. |
| 7,904,327 B2 | 3/2011 | Phelan et al. |
| 7,904,562 B2 | 3/2011 | Takase et al. |
| 7,930,200 B1 | 4/2011 | McGuirtk et al. |
| 7,949,674 B2 | 5/2011 | Middelfart |
| 7,966,322 B2 | 6/2011 | Clover |
| 7,966,330 B2 | 6/2011 | Raghavan et al. |
| 7,979,425 B2 | 7/2011 | Garg et al. |
| 7,996,378 B2 | 8/2011 | Wang et al. |
| 8,000,996 B1 | 8/2011 | Sanli et al. |
| 8,001,112 B2 | 8/2011 | Dombroski |
| 8,032,499 B2 | 10/2011 | Faerber et al. |
| 8,041,670 B2 | 10/2011 | Bakalash et al. |
| 8,051,102 B2 | 11/2011 | Everett |
| 8,065,262 B2 | 11/2011 | Bailey |
| 8,082,239 B2 | 12/2011 | Yang et al. |
| 8,126,871 B2 | 2/2012 | Malloy et al. |
| 8,131,533 B2 | 3/2012 | Legault et al. |
| 8,135,688 B2 | 3/2012 | Shankar et al. |
| 8,150,850 B2 | 4/2012 | Herrnstadt |
| 8,160,917 B1 | 4/2012 | Solanki et al. |
| 8,161,085 B2 | 4/2012 | Souder et al. |
| 8,170,984 B2 | 5/2012 | Bakalash et al. |
| 8,195,602 B2 | 6/2012 | Bakalash et al. |
| 8,195,645 B2 | 6/2012 | Thiebaut-George |
| 8,200,612 B2 | 6/2012 | Soylemez et al. |
| 8,203,972 B2 | 6/2012 | Sauermann |
| 8,209,280 B2 | 6/2012 | Kearney et al. |
| 8,209,294 B2 | 6/2012 | Shankar et al. |
| 8,244,984 B1 | 8/2012 | Glasco et al. |
| 8,327,080 B1 | 12/2012 | Der |
| 8,370,452 B2 | 2/2013 | Harvell et al. |
| 8,392,382 B2 | 3/2013 | Marwah et al. |
| 8,433,684 B2 | 4/2013 | Munoz |
| 8,583,692 B2 | 11/2013 | Ganesh |
| 8,645,337 B2 | 2/2014 | Kapoor et al. |
| 8,832,142 B2 | 9/2014 | Marwah et al. |
| 8,856,484 B2 | 10/2014 | Ben-Trion et al. |
| 9,292,564 B2 | 3/2016 | Kamp et al. |
| 9,514,187 B2 | 12/2016 | Ziauddin |
| 9,941,311 B2 | 4/2018 | Hayk et al. |
| 9,952,782 B1 * | 4/2018 | Chandrasekaran ... G06F 3/0665 |
| 2002/0059287 A1 | 5/2002 | Karasudani |
| 2002/0078068 A1 | 6/2002 | Krishnaprasad et al. |

(56) References Cited

U.S. PATENT DOCUMENTS

| | | |
|---|---|---|
| 2002/0095421 A1 | 7/2002 | Koskas |
| 2003/0115324 A1 | 6/2003 | Blumenau et al. |
| 2003/0126143 A1 | 7/2003 | Roussopoulos |
| 2003/0195898 A1 | 10/2003 | Agarwal et al. |
| 2004/0003087 A1 | 1/2004 | Chambliss et al. |
| 2004/0033803 A1 | 2/2004 | Varonen et al. |
| 2004/0064466 A1 | 4/2004 | Manikutty et al. |
| 2004/0117396 A1 | 6/2004 | Avadhanam et al. |
| 2004/0117441 A1 | 6/2004 | Liu et al. |
| 2004/0148486 A1 | 7/2004 | Burton |
| 2004/0153435 A1 | 8/2004 | Gudbjartsson et al. |
| 2004/0177065 A1 | 9/2004 | Tropf |
| 2004/0225845 A1 | 11/2004 | Kruckemyer et al. |
| 2004/0254943 A1 | 12/2004 | Malcom |
| 2005/0004936 A1 | 1/2005 | Potapov |
| 2005/0033756 A1* | 2/2005 | Kottomtharayil ..... G06F 3/0617 |
| 2005/0044102 A1 | 2/2005 | Gupta et al. |
| 2005/0055355 A1 | 3/2005 | Murthy et al. |
| 2005/0055380 A1 | 3/2005 | Thompson et al. |
| 2005/0056520 A1 | 4/2005 | Dharmapurikar et al. |
| 2005/0086267 A1 | 4/2005 | Avadhanam et al. |
| 2005/0102467 A1 | 5/2005 | Lam et al. |
| 2005/0160224 A1 | 7/2005 | Cuomo et al. |
| 2005/0165798 A1 | 7/2005 | Cherkauer et al. |
| 2005/0193160 A1 | 9/2005 | Bhatt et al. |
| 2005/0210202 A1 | 9/2005 | Choubal et al. |
| 2006/0047670 A1 | 3/2006 | Yu et al. |
| 2006/0064441 A1 | 3/2006 | Yamamoto |
| 2006/0106890 A1 | 5/2006 | Paul et al. |
| 2006/0173833 A1 | 8/2006 | Purcell et al. |
| 2006/0224451 A1 | 10/2006 | Kerschbrock et al. |
| 2006/0224551 A1 | 10/2006 | Lariba-Pey et al. |
| 2006/0253429 A1 | 11/2006 | Raghavan |
| 2007/0041718 A1 | 2/2007 | Fontijn |
| 2007/0006757 A1 | 3/2007 | Morris et al. |
| 2007/0061287 A1 | 3/2007 | Le et al. |
| 2007/0078813 A1 | 4/2007 | Beavin |
| 2007/0078914 A1 | 4/2007 | Correl |
| 2007/0124415 A1 | 5/2007 | Lev-Ran et al. |
| 2007/0156957 A1 | 7/2007 | MacHardy et al. |
| 2007/0220348 A1 | 9/2007 | Mendoza et al. |
| 2007/0260819 A1 | 11/2007 | Gao et al. |
| 2008/0046736 A1 | 2/2008 | Arimilli et al. |
| 2008/0059492 A1 | 3/2008 | Tarin |
| 2008/0014759 A1 | 6/2008 | Young-Lai |
| 2008/0155229 A1 | 6/2008 | Beyer et al. |
| 2008/0195668 A1 | 8/2008 | Chandrasekar et al. |
| 2008/0235479 A1 | 9/2008 | Scales |
| 2008/0256250 A1 | 10/2008 | Wakefield |
| 2008/0281784 A1 | 11/2008 | Zane et al. |
| 2008/0281865 A1 | 11/2008 | Price et al. |
| 2008/0307266 A1 | 12/2008 | Chandrasekaran |
| 2009/0106210 A1 | 4/2009 | Slezak |
| 2009/0193189 A1 | 7/2009 | Carswell et al. |
| 2009/0248871 A1 | 10/2009 | Takase et al. |
| 2009/0307290 A1 | 12/2009 | Barsness et al. |
| 2010/0017556 A1 | 1/2010 | Chin et al. |
| 2010/0070448 A1 | 3/2010 | Omoigui |
| 2010/0077107 A1 | 3/2010 | Lee et al. |
| 2010/0082648 A1 | 4/2010 | Potapov |
| 2010/0122026 A1 | 5/2010 | Umamageswaran et al. |
| 2010/0161567 A1 | 6/2010 | Makela |
| 2010/0235335 A1 | 9/2010 | Heman et al. |
| 2010/0235344 A1 | 9/2010 | Chandrasekar |
| 2010/0250549 A1 | 9/2010 | Muller et al. |
| 2010/0257181 A1 | 10/2010 | Zhou |
| 2010/0281017 A1 | 11/2010 | Hu |
| 2010/0332901 A1 | 12/2010 | Nussbaum et al. |
| 2011/0016157 A1 | 1/2011 | Bear et al. |
| 2011/0022801 A1 | 1/2011 | Flynn |
| 2011/0029569 A1 | 2/2011 | Ganesh et al. |
| 2011/0035369 A1 | 2/2011 | Halasipuram |
| 2011/0066791 A1 | 3/2011 | Goyal |
| 2011/0137940 A1 | 6/2011 | Gradin et al. |
| 2011/0138123 A1 | 6/2011 | Aditya et al. |
| 2011/0173325 A1 | 7/2011 | Cherian et al. |
| 2011/0191522 A1 | 8/2011 | Condict |
| 2011/0191543 A1 | 8/2011 | Craske et al. |
| 2011/0258376 A1 | 10/2011 | Young |
| 2012/0005184 A1 | 1/2012 | Thilagar et al. |
| 2012/0084287 A1 | 4/2012 | Lakshminarayan |
| 2012/0117038 A1 | 5/2012 | Ganesh et al. |
| 2012/0117054 A1 | 5/2012 | Shrinivas |
| 2012/0173515 A1 | 7/2012 | Chanho et al. |
| 2012/0173774 A1 | 7/2012 | Lee |
| 2012/0209873 A1 | 8/2012 | He |
| 2012/0290588 A1 | 11/2012 | Egan |
| 2012/0296883 A1 | 11/2012 | Ganesh |
| 2012/0323971 A1 | 12/2012 | Pasupuleti |
| 2013/0086330 A1 | 4/2013 | Baddepudi |
| 2013/0151491 A1 | 6/2013 | Gislason |
| 2013/0198165 A1 | 8/2013 | Cheng |
| 2013/0212332 A1 | 8/2013 | Umamageswaran |
| 2013/0232190 A1 | 9/2013 | Miller et al. |
| 2013/0326152 A1 | 12/2013 | Loaiza et al. |
| 2014/0040218 A1 | 2/2014 | Kimura et al. |
| 2014/0075493 A1 | 3/2014 | Krishnan et al. |
| 2014/0108751 A1 | 4/2014 | Brown et al. |
| 2014/0281247 A1 | 9/2014 | Loaiza et al. |
| 2014/0337314 A1 | 11/2014 | Potapov et al. |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp et al. |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0089138 A1 | 3/2015 | Tao et al. |
| 2015/0089140 A1 | 3/2015 | Sridharan et al. |
| 2015/0100556 A1* | 4/2015 | Sekiguchi ............... H03M 7/30 707/693 |
| 2015/0149479 A1 | 5/2015 | Geringer et al. |
| 2015/0242452 A1 | 8/2015 | Dickie |
| 2016/0092491 A1 | 3/2016 | Cowling |
| 2016/0092507 A1 | 3/2016 | Ng et al. |
| 2016/0140137 A1 | 5/2016 | Konik |
| 2017/0060918 A1* | 3/2017 | Iyer ..................... G06F 21/6218 |
| 2017/0116136 A1 | 4/2017 | Macnicol |

FOREIGN PATENT DOCUMENTS

| | | |
|---|---|---|
| GB | 1 332 631 A | 10/1973 |
| GB | 2409 301 A | 6/2005 |
| JP | 2002278704 A | 9/2002 |
| JP | 2003150419 A | 5/2003 |
| JP | 2004038758 A | 2/2004 |
| WO | WO 93/18461 | 9/1993 |
| WO | WO2007/078444 A1 | 7/2007 |
| WO | WO2012/032184 A1 | 3/2012 |
| WO | WO 2012/032184 A1 | 3/2012 |

OTHER PUBLICATIONS

Ng, U.S. Appl. No. 14/726,372, filed May 29, 2015, Office Action, dated Sep. 19, 2017.

U.S. Appl. No. 13/840,811, filed Mar. 15, 2013, Interview Summary, dated Apr. 27, 2015.

U.S. Appl. No. 13/629,897, filed Sep. 28, 2012, Office Action, dated Mar. 18, 2014.

U.S. Appl. No. 13/629,897, filed Sep. 28, 2012, Office Action, dated Jun. 19, 2014.

U.S. Appl. No. 13/629,897, filed Sep. 28, 2012, Final Office Action, dated Jan. 4, 2016.

U.S. Appl. No. 13/629,897, filed Sep. 28, 2012, Notice of Allowance, dated Apr. 28, 2016.

U.S. Appl. No. 13/629,897, filed Sep. 28, 2012, Office Action, dated Feb. 26, 2016.

U.S. Appl. No. 13/629,897, filed Sep. 28, 2012, Office Action, dated Oct. 5, 2015.

U.S. Appl. No. 13/629,907 filed Sep. 28, 2012, Office Action, dated May 22, 2014.

(56) References Cited

OTHER PUBLICATIONS

U.S. Appl. No. 13/629,907, filed Sep. 28, 2012, Notice of Allowance, dated Dec. 1, 2014.
U.S. Appl. No. 13/840,811, filed Mar. 15, 2013, Final Office Action, dated Jul. 15, 2015.
Loaiza, U.S. Appl. No. 13/840,811, filed Mar. 15, 2013, Office Action, dated Dec. 15, 2016.
U.S. Appl. No. 13/840,811, filed Mar. 15, 2013, Interview Summary, dated Apr. 5, 2016.
U.S. Appl. No. 14/490,367, filed Sep. 18, 2014, Office Action, dated Mar. 10, 2016.
U.S. Appl. No. 13/840,811, filed Mar. 15, 2013, Office Action, dated Jan. 12, 2015.
U.S. Appl. No. 14/245,934, filed Apr. 4, 2014, Notice of Allowance, dated Jul. 25, 2016.
U.S. Appl. No. 14/245,934, filed Apr. 4, 2014, Office Action, dated Mar. 17, 2016.
U.S. Appl. No. 14/337,179, filed Jul. 21, 2014, Final Office Action, dated Apr. 10, 2015.
U.S. Appl. No. 14/337,179, filed Jul. 21, 2014, Interview Summary, dated Jun. 17, 2015.
U.S. Appl. No. 14/337,179, filed Jul. 21, 2014, Notice of Allowance, dated Nov. 3, 2015.
U.S. Appl. No. 14/337,179, filed Jul. 21, 2014, Office Action, dated Dec. 29, 2014.
U.S. Appl. No. 14/337,179, filed 074/21/2014, Notice of Allowance, dated Jul. 29, 2015.
U.S. Appl. No. 14/490,367, filed Sep. 18, 2014, Final Office Action, dated Oct. 6, 2016.
U.S. Appl. No. 13/840,811, filed Mar. 15, 2013, Final Office Action, dated Dec. 21, 2015.
Loaiza, U.S. Appl. No. 13/840,811, filed Mar. 15, 2013, Office Action, dated Jan. 10, 2018.
DB Technology, "Netezza Questions and Answers", dated Aug. 2, 2009, 5 pages.
"XQuery 1.0: An XML Query Language", dated Dec. 14, 2010, W3C, 165 pages.
IBM DB2 Universal Database, "Administration Guide: Planning", IBM, dated Jan. 1, 2004, 102 pages.
Howard, Philip, "Netezza: More Than You Might Imagine", Bloor Research, dated Oct. 3, 2006, 6 pages.
Graefe et al., "Hash joins and hash teams in Microsoft SQL server," 1998. Proceedings of the 24th VLDB Conference New York, USA, pp. 87-90.
Farber et al., "SAP HANA Database—Data Management for Modern Business Applications", SIGMOD Record, dated Dec. 2011, vol. 40, No. 4, 8 pages.
Elmasri, et al, "Fundatmentals of Database Systems," Third Edition, Addison-Wesley Longman, 2000, pp. 32, 70, 118, 131-132, 134, 155-159, 170, 252-254, 558, 569-573, 591-592, and 789-790 (26 pgs).
Dittrich et al., "Towards a One Size Fits All Database Architecture" Proceedings of the 5th Biennial Conference on Innovative Data Systems Research, dated Jan. 6, 2011, 4 pages.
Dijcks, Jean-Pierre, "A Not So fabulous New Release (The Data Warehouse Insider)", dated Aug. 30, 2009, 9 pages.
IBM, "Best Practices Physical Database Design for Data Warehouse Environments", dated 2012, 70 pages.
DBMS 2: DataBase Management System Services, "Netezza vs. Conventional Data Warehousing RDBMS", dated Sep. 20, 2006, 8 pages.
Khalid Sayood:, "Introduction to data Compression", Morgan Kaufmann Publisher, dated Dec. 1996, 4 pages.
Chen et al., "Adjoined Dimension Colum Clustering to Improve Data Warehouse Query Performance", IEEE, dated 2008, 4 pages.
Bloom, Burton H. (1970), "Space/time trade-offs in hash coding with allowable errors", Communications of the ACM 13 (7): 422-426.
Birmingham, David, "Netezza Underground", "Zone Maps and Data Power", dated Jul. 11, 2011, 5 pages.

Big Data Topics, "Using nz_Zonemap to Visualize Netezza's Zone Map Effectiveness", dated Jul. 20, 2012, 5 pages.
Battacharjee et al., "Efficient Query Processing for Multi-Dimensionally Cluster Tables in DB2", Proceedings dated 2003, VLDB Conference, dated Jan. 1, 2013, 12 pages.
Banerjee et al., "Oracle8i-the XML Enabled Data Management System", dated 2000 Proceedings 16th International, Conference on Data Engineering, 8 pages.
An Oracle White Paper, "A Technical Overview of the Oracle Exadata Database Machine and Exadata Storage Server", dated Jun. 2012, 36 pages.
Ailamaki, Anastassia, et al, "Weaving Relations for Cache Performance," Proceedings of the 27th International Conference on Very Large Data Bases, Rome, Italy, Sep. 11-14, 2001, 14 pages.
Abadi, D. et al., "Column-Stores vs. Row-Stores: How Different Are They Really?", Sigmod 2008(14 pages).
Dharmapurikar, Sarang, et al., "Deep Packet Inspection using Parallel Bloom Filters", <http://www.arl.wustl.edu/~sarang/27_dharmapurikar_s_updated.pdf>, retrieved on Oct. 28, 2005, 8 pages.
Oracle, "Data Warehousing on Oracle RAC Best Practices," Oct. 2008, 28 pages. http://www.oracle.com/technology/products/database/clustering/pdf/bp_rac_dw.pdf.
W3Schools "SQL Update Statement", Wayback Machine darted Apr. 19, 2012, on the internet www.w3schools.com/sql/sql_update.asp>, 1 page.
Snow, Dwaine, "FUD Competitors are Spreading on Netezza", dated Jun. 28, 2012, 3 pages.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ronthal, Adam, "Appliances Are Easy to Use", Blog, dated Mar. 27, 2012, 3 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle, Help Center, "Database Installation Guide", 3 Oracle Grid Infrastructure for a Standalone Server, dated 2016, 29 pages.
IBM TDB, "A Scheduling Algorithm for Processing Mutually Exclusive Workloads in a multi-system Configuration", ip.com dated Aug. 19, 2002 (3 pages).
Oracle, "Oracle7 Server Concepts", Release 7.3, dated Feb. 1996, 178 pages.
Zhe, Li, et al., "PERF join: an alternative to two-way semijoin and Bloomjoin" Proceedings of the 1995 ACM CIKM International Conference on Information and Knowledge Management 1995, pp. 187-144.
Oracle Database, "Oracle Real Application Clusters (RAC)", An Oracle White Paper, dated Jun. 2013; 23 pages.
O'Neil et al., "The Star Schema Benchmark and Augmented fact Table Indexing", dated Aug. 24, 2009, 16 pages.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
NZGuv, Netezza Tips, Tricks and Cool SQL, "With Netezza Always Use Integer Join Keys for Good Compression, Zone Maps, and Joins" dated Nov. 20, 2010, 1 page.
Nirmesh, Malviya, "Recovery Algorithms for In-Memory OLTP Databases", Master of Science Thesis, dated Jul. 1, 2012, 66 pages.
Netezza Database Software Technology, "A partial Overview of Netzza Database Software Technology", dated Jun. 21, 2010, 12 pages.
Nanda, Arupa, "Oracle Exadata: Smart Scans Meet Storage Indexes", dated May 2011, 4 pages.
Microsoft, "Database Instant File Initialization", SQL Server 2016, https://msdn.microsoft.com/en-us/library/ms175935.aspx, 3 pages.
Loizos et al., "Improving Join Efficiency with Extended Bloom Filter Operations", AMC, 2007, 8 pages.
Oracle, Automatic Storage Management Administrator's Guide, 1 Introduction to Oracle Automatic Storage Management, dated 2016, 12 pages.

(56) References Cited

OTHER PUBLICATIONS

Macnicol, U.S. Appl. No. 15/268,254, filed Sep. 16, 2016, Notice of Allowance, dated Mar. 27, 2018.
Ng, U.S. Appl. No. 14/726,372, filed May 29, 2015, Office Action, dated May 18, 2018.
Loaiza, U.S. Appl. No. 13/840,811, filed Mar. 15, 2013, Notice of Allowance, dated Jun. 7, 2018.
Loaiza, U.S. Appl. No. 13/840,811, filed Mar. 15, 2013, Final Office Action, dated Jul. 5, 2017.
Sridharan, U.S. Appl. No. 14/490,367, filed Sep. 18, 2014, Notice of Allowance, dated May 12, 2017.
Loaiza, U.S. Appl. No. 13/840,811, filed Mar. 15, 2013, Interview Summary, filed Mar. 30, 2017.
Ng, U.S. Appl. No. 14/726,372, filed May 29, 2015, Notice of Allowance, dated Aug. 28, 2019.
Meiyyappan, U.S. Appl. No. 15/721,328, filed Sep. 29, 2017, Office Action, dated Nov. 29, 2019.
Oracle, "Using the Database Resource Manager", Chapter 24, Using the Database Resource Manager, dated May 2006, 34 pages.
Oracle Database, "Administrator's Guide", 11g Release 2 (11.2), Chapter 27, dated May 2015, 65 pages.

* cited by examiner

202 — MAINTAIN A DATABASE ON PERSISTENT STORAGE OF A STORAGE DEVICE

204 — MAINTAIN ONE OR MORE DERIVED CACHES IN MEMORY OF THE STORAGE DEVICE; WHEREIN A PARTICULAR DERIVED CACHE, OF THE ONE OR MORE DERIVED CACHES, INCLUDES INFORMATION DERIVED FROM A UNIT OF DATA, FROM THE DATABASE, THAT IS STORED PERSISTENTLY IN A PARTICULAR REGION OF THE PERSISTENT STORAGE

206 — DETERMINE TO COPY THE UNIT OF DATA, THAT IS STORED IN THE PARTICULAR REGION OF THE PERSISTENT STORAGE, TO A SECOND STORAGE DEVICE

208 — COPY THE UNIT OF DATA, THAT IS STORED IN THE PARTICULAR REGION OF THE PERSISTENT STORAGE, TO A SECOND STORAGE DEVICE

210 — COPY THE PARTICULAR DERIVED CACHE TO THE SECOND STORAGE DEVICE

RELOCATING DERIVED CACHE DURING
DATA REBALANCE TO MAINTAIN
APPLICATION PERFORMANCE

CROSS-REFERENCE TO RELATED
APPLICATIONS; BENEFIT CLAIM

This application claims the benefit of Provisional Appln. No. 62/280,862, filed Jan. 20, 2016, titled "Storage Index And Columnar Cache Relocation During ASM Rebalance", the entire contents of which is hereby incorporated by reference as if fully set forth herein, under 35 U.S.C. § 119(e).

This application is related to the following applications, the entire contents of each of which is hereby incorporated by reference as if fully set forth herein:
- U.S. Pat. No. 9,292,564, filed Jul. 21, 2014 and issued Mar. 22, 2016, titled "Mirroring, In Memory, Data From Disk To Improve Query Performance", referred to herein as the "Mirroring Application";
- U.S. patent application Ser. No. 14/726,372, filed May 29, 2015, titled "Optimizing A Query With Extrema Function Using In-Memory Data Summaries On The Storage Server";
- U.S. patent application Ser. No. 15/268,524, filed Sep. 16, 2016, titled "Reducing Data I/O Using In-Memory Data Structures";
- U.S. Pat. No. 9,430,550, filed Sep. 28, 2012 and issued Aug. 30, 2016, titled "Clustering A Table In A Relational Database Management System";
- U.S. Pat. No. 8,996,544, filed Sep. 28, 2012 and issued Mar. 31, 2015, titled "Pruning Disk Blocks Of A Clustered Table In A Relational Database Management System";
- U.S. patent application Ser. No. 14/245,934, filed Apr. 4, 2014, titled "Techniques For Using Zone Map Information For Post Index Access Pruning";
- U.S. patent application Ser. No. 13/840,811, filed Mar. 15, 2013, titled "Method To Accelerate Queries Using Dynamically Generated Alternate Data Formats In Flash Cache";
- U.S. Patent Appln. No. 62/245,193, filed Oct. 22, 2015, titled "Columnar Caching In Tiered Storage"; and
- U.S. patent application Ser. No. 14/490,367, filed Sep. 18, 2014, titled "Movement Offload To Storage Systems".

FIELD OF THE INVENTION

The present invention relates to increasing the efficiency of querying database data by moving or copying derived caches, that are derived from the database data, during data rebalance.

BACKGROUND

At times, it is useful for a database management system (DBMS) to generate and maintain data that is derived from database data, such as metadata that describes particular portions of tables stored within a database, data that is stored in a different format than the database data, etc. For example, for each one megabyte (MB) of a given table in a database, the DBMS that manages the database derives metadata that indicates particular aspects of the data in that one MB, e.g., the max and min values for a given column in the table. This metadata is computed as data loads and updates and is also computed as the DBMS scans the table in connection with responding to queries over the table. The DBMS stores, e.g., in main memory, this derived metadata as a data summary in a "derived cache" that is associated with the database data from which the data summary is derived.

The DBMS utilizes derived caches associated with a particular table to speed up processing of queries that run over the table. In the context of a data summary that includes min and max data for a particular column of a table, the DBMS uses the min and max data from the data summary to determine whether the portion of the table associated with the min and max data includes information that is required by the query.

For example, a particular query selects rows from a table T that includes a column A, where the value of column A is less than five. During execution of this query, the DBMS determines, from a derived metadata summary stored for a particular portion of table T, that the min value of column A within that portion of the table is 10. As such, none of the rows within the portion of table T associated with this derived cache are selected by the query, and the DBMS need not scan the rows in that portion of table T in order to execute the query. In this way, the DBMS uses a derived cache to prune input/output (I/O) operations from the query execution, specifically, I/O operations on the portion of table T that is associated with the derived cache.

Since I/O operations are relatively costly operations, the ability to prune I/O operations from query execution increases the efficiency of executing queries that involve values summarized in derived caches. Likewise, other types of derived caches speed up execution of operations over database data and, as such, increase the efficiency of the DBMS.

Generally, derived cache data is built based on queries and other operations (such as data loads and updates) that have been run over a particular instance of data, i.e., from which the derived cache is derived. As such, data that has been newly replicated or relocated does not have the benefit of derived cache data to increase the efficiency of operations over the data. It would be beneficial to make derived cache data, that is derived based on other instances of particular data, available to the DBMS in connection with other, newer, replicas of the particular data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for establishing derived caches, derived from a particular instance of data, at a location of a new instance of the data.

DETAILED DESCRIPTION

Figure 1:
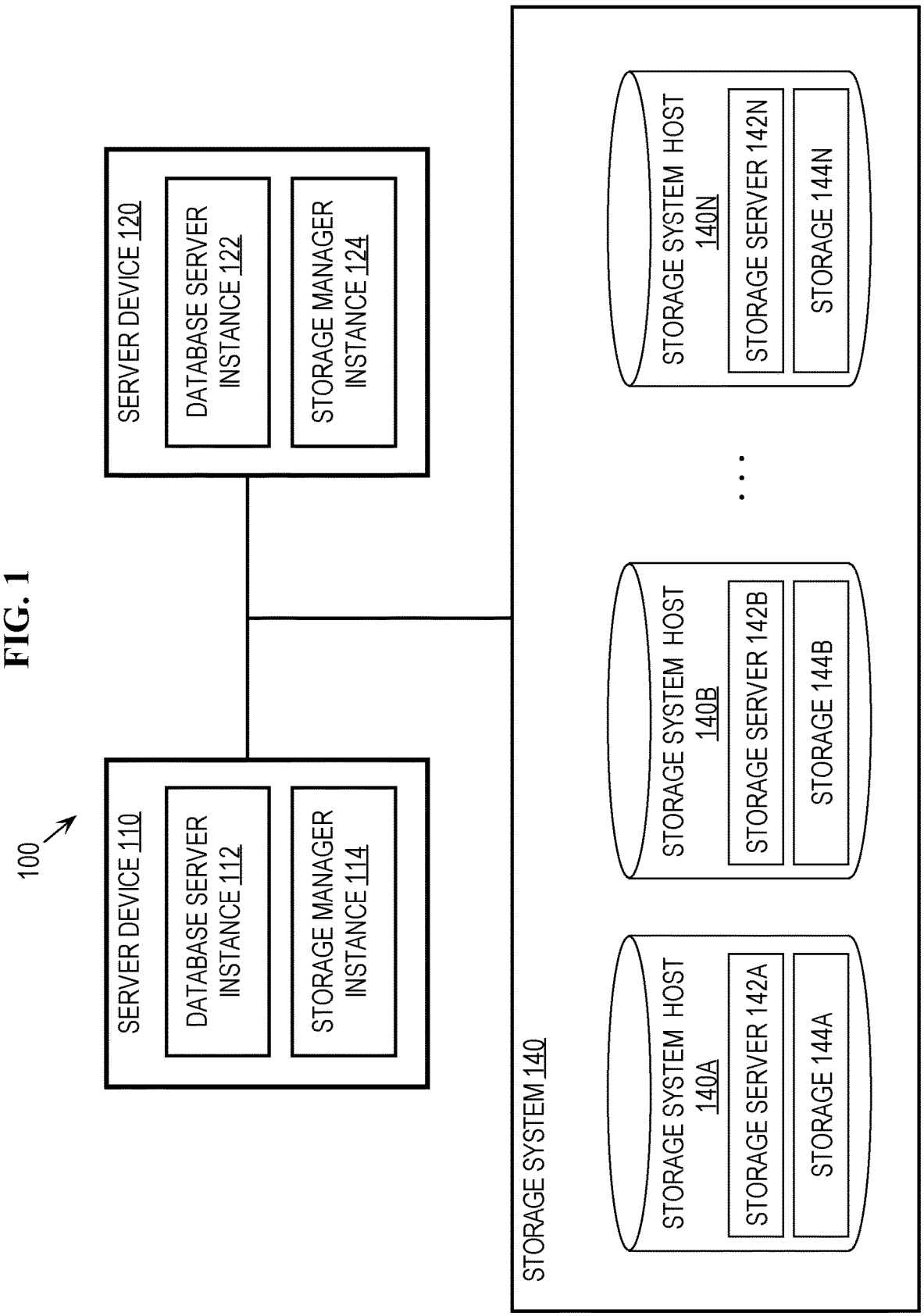
FIG. 1 is a block diagram that depicts an example network arrangement for relocating derived cache data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Derived caches (e.g., Storage Indexes or data summaries, Columnar Cache, etc.) are caches of data that are derived from persistently-stored database data. A DBMS can use a derived cache to speed up application processing over the database data.

According to embodiments, a derived cache that is derived from a first instance of particular data is used to speed up queries and other operations over a second instance of the particular data. Traditionally, a DBMS generates and uses derived cache data only for the database data from which the derived data was derived. However, according to embodiments, derived cache data associated with a first instance of database data is relocated to the location of a second, newly created, instance of the database data. Since the derived cache data is derived from an identical copy of the database data, the cache data derived for the first instance can successfully be used to speed up applications running over the second instance of the database data.

Derived Caches

A derived cache is composed of data that is derived from persistent data, such as database data. Unlike cache data comprising a reproduction of one or more portions of persistent data, which is stored in a cache in order to speed up access to the information stored on disk, derived data (in a derived cache) comprises metadata describing associated persistent data (such as Storage Indexes or data summaries), or comprises information from persistent data that is in a different format than the format of associated persistent data (such as Columnar Cache).

A Storage Index is a type of derived cache that stores data summaries, which comprise metadata (such as min and max values of particular columns, whether given columns include null values, etc.) about an associated portion of database data. To illustrate, a particular Storage Index associated with a given portion of database data indicates the min and max values of a particular column within a table represented within the associated portion of database data.

According to one or more embodiments, Storage Indexes (and other types of derived cache), are stored in main memory of a storage system host that also persistently stores associated persistent data. (For more information about Storage Indexes, see "Smart Scans Meet Storage Indexes", by Arup Nanda, published in Oracle Magazine, May/June 2011, the entire contents of which are incorporated by reference hereby as if fully set forth herein.)

Another example of a derived cache represents associated persistent data in a different format than the format in which the persistent data is stored on disk. For example, a Columnar Cache is a derived cache that stores, in a column-based format, data that is stored on disk in a row-based format.

According to embodiments, Columnar Cache is stored in volatile memory, on persistent storage, and/or in a flash memory, such as the flash cache of an Exadata system. (See "A Technical Overview of the Oracle Exadata Database Machine and Exadata Storage Server", An Oracle White Paper, June 2012, found at the time of writing this document as "exadata-technical-whitepaper-134575.pdf" at http://www.oracle.com/technetwork/database/exadata/. The entire contents of this document is incorporated by reference hereby as if fully set forth herein.)

According to one or more embodiments, each derived cache is associated with a discrete portion of persistently-stored data. A portion of data is a unit of allocation within storage system hosts (or "cells") of a storage system, where each unit of allocation is comprised of a certain amount of data, such as 1, 2, 4, 8, 16, 32, or 64 megabytes.

A DBMS may generate derived data when data is loaded, when data is updated, and/or while the DBMS scans the associated portion of data in connection with running operations over the data. Thus, derived caches are built up over time. As the execution of operations over the data require calculation of data summaries and/or require conversion of data into a different format than the format in which the data is stored on disk, the storage server in a storage system host stores these data summaries or reformatted data into derived caches. These derived caches may then be used to speed up operations over the associated data. For example, a storage server in a storage system host determines, based on any derived cache associated with database data referred to by a particular query, whether any portion of query processing (such as data reformatting or I/O operations) may be pruned or skipped.

Creating New Replicas of Database Data

At times, derived cache data, that is developed for a first instance of particular data, can be used to speed up query processing over a second instance of the particular data. Specifically, when the second instance of data is a new replica of the particular data, derived cache data developed for another replica of the data can be used to speed up processing of operations over the new replica without waiting for independent development of derived caches for the new replica.

FIG. 1 depicts an example network arrangement 100 for relocating derived cache data, according to one or more embodiments. Network arrangement 100 includes server devices 110 and 120 that, for example, are nodes in a multi-node database management system (DBMS). Server devices 110 and 120 are communicatively coupled to a storage system 140. Storage system 140 stores, e.g., in both memory and on disk, data for one or more databases managed by the DBMS.

Storage manager instances 114 and 124 are run on server devices 110 and 120, respectively. Storage manager instances 114 and 124 are responsible for initializing cell-to-cell rebalancing among the storage system hosts (or "cells") in storage system 140. Once cell-to-cell rebalancing is initiated among two of the cells, the storage servers on the cells take responsibility for relocating data (and derived cache) amongst the cell storage. Accordingly, storage servers 142A-N (within the cells of storage system 140) locally manage data stored within storage system 140, i.e., by performing read/write I/O, managing data cache, managing derived cache, performing smart scan, taking part in cell-to-cell rebalancing, etc. Storage system 140 includes multiple storage system hosts 140A-N, each of which represent a storage server 142 and storage 144, which includes one or more of flash memory, volatile memory, and/or one or more storage disks. Storage 144 within the cells of storage system 140 may be used to store redundant physical replicas of database data.

Storage manager instances 114 and 124 collectively implement a storage management system that manages where, within storage system 140, particular data is stored. Storage manager instances 114 and 124 provide instructions to storage servers 142A-N as to how cell-to-cell data rebalancing should be accomplished, including on what cell particular data should be stored. The storage management system also manages data redundancy, including automatically creating additional physical replicas of data when needed, e.g., when a disk failure causes a previously-established physical replica of data to become unusable.

Many times, administrator require a DBMS to store multiple copies of particular database data at all times, which reduces the likelihood of data loss. When required, the DBMS establishes (via the storage management system) the indicated number of copies of the indicated database data, i.e., within storage system 140 of FIG. 2. When the DBMS detects a disk failure that compromises one of the replicas of the database data, the storage management system initiates rebalancing of the data that was on the failed disk in order to preserve required redundancy in the system. As such, in response to detecting such a failure, the storage management system provides instructions for storage servers 142A-N to aggressively copy one of the remaining copies of the data to a new physical replica in order to conform to the redundancy requirement for the particular data.

At times, when persistent data is copied or moved from one location to another (e.g., because of data rebalancing among nodes in a cluster, initiated by storage manager instance 114 or 124, etc.), derived data that is associated with the persistent data is not replicated to memory of the destination cell. Derived caches are recorded for the new replica of the database data, without benefit of derived data developed for other replicas of the data, in the new location as the replica on the destination cell is scanned for operations over the data.

However, according to one or more embodiments, derived cache data, associated with particular database data, is relocated to the destination of a new replica of the database data as depicted in flowchart 200 of FIG. 2. Thus, derived cache data is immediately available to speed up operation processing over the new database replica.

Figure 3:
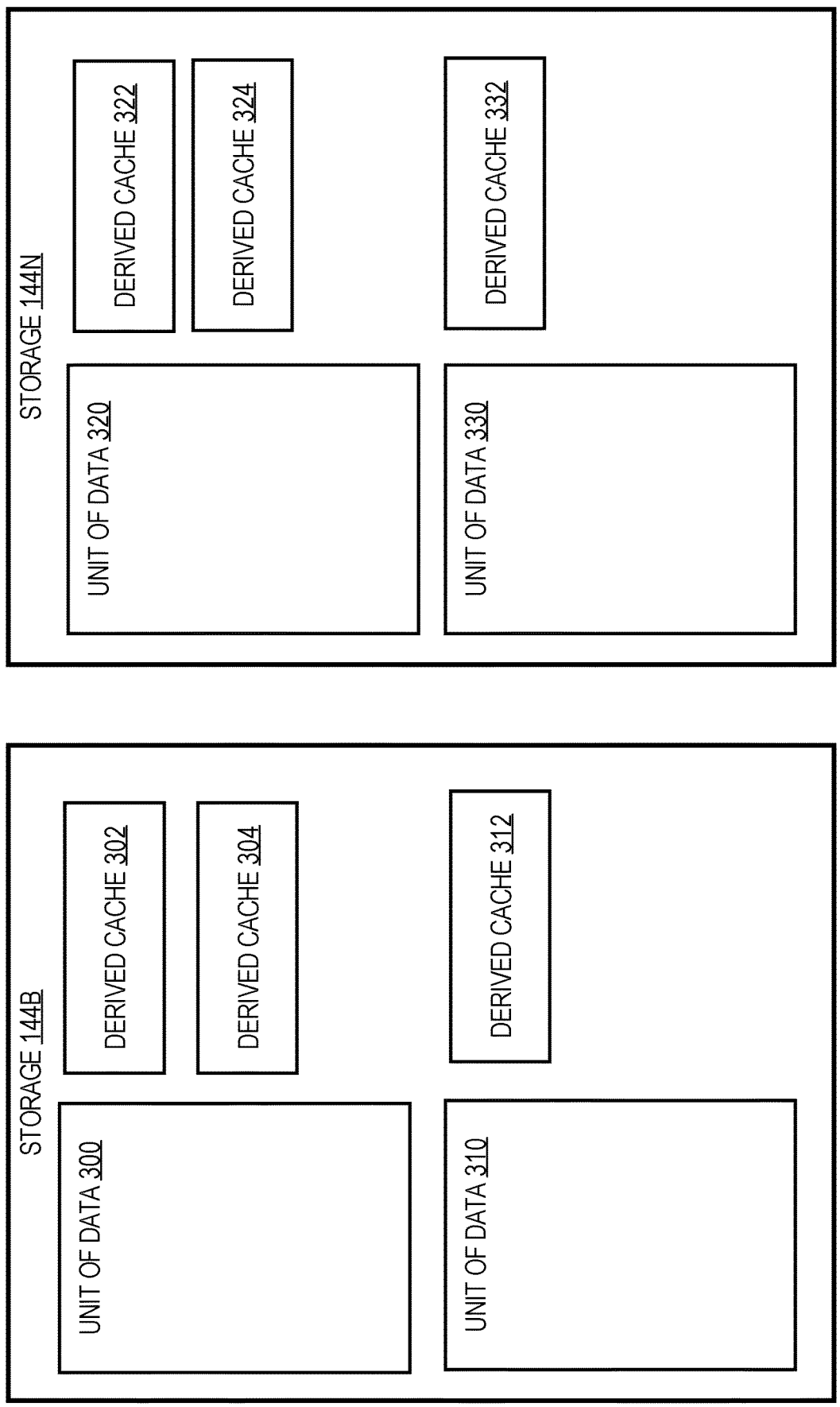
FIG. 3 depicts units of data and associated derived caches within one or more disks of storage system hosts.

At step 202 of flowchart 200, a database is maintained on persistent storage of a storage device. For example, database server instance 112 maintains particular database data on a disk of storage 144B. FIG. 3 depicts units of data 300 and 310 within one or more disks of storage 144B. Units of data 300 and 310 represent two portions of database data in a particular table in a database managed by database server instance 112.

Each unit of data is uniquely identifiable, at least based on an identifier of the partition of a cell disk (which is referred to as a "grid disk") of a storage 144 in which the unit of data is stored, and an offset into the identified grid disk. For example, unit of data 300 is from grid disk number 4 (within storage 144B) and offset 500 with a length of 1 MB, and unit of data 310 is from grid disk number 5 (within storage 144B) and offset 100 with a length of 1 MB.

At step 204, one or more derived caches are maintained in memory of the storage device, wherein a particular derived cache, of the one or more derived caches, includes information derived from a unit of data, from the database, that is stored persistently in a particular region of the persistent storage. For example, as database server instance 112 performs operations over unit of data 300, storage server 142B compile one or more data summaries of unit of data 300 and stores the one or more data summaries to a derived cache 302 within storage 144B. As a further example, storage server 142B reformat at least a portion of unit of data 300 from a row-based format to a column-based format and storage server 142B store the reformatted data to derived cache 304 within storage 144B. Derived caches 302 and 304 are, therefore, derived from data in unit of data 300 and are associated with that unit of data.

Storage servers 142A-N store derived caches, derived from a particular unit of data, based on the same unique identifier as the particular unit of data. As such, derived caches 302 and 304 are identified as the derived caches associated with the unique identifier (of unit of data 300) grid disk number 4, of storage 144B, and offset 500.

At step 206, it is determined to copy the unit of data, that is stored in the particular region of the persistent storage, to a second storage device. Copying the unit of data may be a result of data rebalancing among storage system hosts 140A-N, initiation by storage manager instance 114 or 124, etc.

For example, storage manager instance 114 detects that a disk within storage system host 140A has failed. In response to detecting the failure, storage manager instance 114 determines that a new physical replica of database data that is stored within the failed disk of storage 144A needs to be created, i.e., based on a replication policy for the data. In this example, the replication policy for the data mandates that the data be physically replicated on at least two storage cells at all times.

According to one or more embodiments, steps 208 and 210 are performed in response to determining to copy the unit of data, that is stored in the particular region of the persistent storage, to a second storage device.

At step 208, the unit of data, that is stored in the particular region of the persistent storage, is copied to a second storage device. Continuing with the previous example, before the failure of storage 144A, the replication policy was being complied with by maintaining replicas of the data on both storage system host 140A and storage system host 140B (where units of data 300 and 310 comprise at least a portion of the physical replica of the data housed on disk at storage system host 140B).

Thus, based on the replication policy, storage manager instance 114 initiates creation of a new replica of the database data on the failed disk of storage system host 140A. Storage manager instance 114 automatically identifies storage system host 140N as the destination location for the new replica. As instructed by storage manager instance 114, storage server 142B automatically begins copying the replica of the data from storage 144B to storage 144N, including copying unit of data 300 from storage 144B to storage 144N. The new replica of unit of data 300, within storage 144N, is represented in FIG. 3 as unit of data 320. The location within storage 144N of the new physical replica unit of data 320, is grid disk 1 (on storage 144N) with offset of 200.

At step 210, the particular derived cache is copied to the second storage device. For example, a storage server of a cell identifies one or more derived caches associated with a particular unit of data being copied from the storage of the cell based on the unique identifier of the unit of data. In the context of FIG. 3, storage server 142B identifies derived caches 302 and 304 as having the same identifier as unit of data 300 and, as such, these derived caches are associated with unit of data 300. Because derived caches 302 and 304 are associated with a unit of data being copied to storage 144N, storage server 142B also copies derived caches 302 and 304 to storage 144N (e.g., into main memory or flash memory, as needed), where the copies of derived caches 302 and 304 within storage 144N are represented in FIG. 3 as derived caches 322 and 324.

Storage server 142N assigns derived caches 322 and 324 the same unique identifier as unit of data 320, with which the copied derived caches are associated in the cell. Specifically, according to the example above, storage server 142N causes derived caches 322 and 324 to be read out at grid disk 1 (of storage 144N) at offset 200.

According to one or more embodiments, storage manager instance 114 also instructs storage server 142B to copy unit of data 310 from storage 144B to storage 144N. The replica of unit of data 310 within storage 144N is represented as unit of data 330. In a manner similar to that described for unit of data 300 above, storage server 142B identifies derived cache 312 as being associated with unit of data 310 based on the derived cache having the same unique identifier as unit of data 310. In connection with copying unit of data 310, storage server 142B automatically copies derived cache 312 to the memory of storage 144N. In FIG. 3, the copy of derived cache 312 in storage 144N is represented as derived cache 332. Derived cache 332 is identified within storage 144N using the same unique identifier as unit of data 330.

Architecture for Replicating Derived Caches

According to one or more embodiments, one or both of server devices 110 and 120 implement a single-server database management system. According to one or more embodiments, server devices 110 and 120 are nodes in a cluster of nodes managed by a multi-node DBMS, e.g., a shared-everything cluster database environment (such as Oracle Real Application Clusters ("RAC")). (See "Oracle Real Application Clusters (RAC)", An Oracle White Paper, June 2013, Oracle Database 12C documentation. This document is incorporated by reference as if fully set forth herein.) According to one or more embodiments, any number of nodes may be part of a node cluster managed by a multi-node DBMS. Specifically, resources from multiple nodes in a multi-node database system can be allocated to run a particular database server's software.

Server devices 110 and 120 are implemented by any type of computing device that is capable of communicating with storage system 140 and also capable of running a database server instance and a storage manager instance. In network arrangement 100, server device 110 is configured with a database server instance 112 and server device 120 is configured with a database server instance 122.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients.

Database server instances 112 and 122 maintain access to and manage database data in storage 144A-N within storage system 140. According to one or more embodiments, access to a given database comprises access to (a) a set of disk drives storing data for the database, and (b) data blocks stored thereon.

Storage system hosts 140A-N in storage system 140 include computer hardware components, and may further include software components. One or more storage servers 142A-N execute on storage system hosts 140A-N. Storage servers 142A-N are integrated software components and allocations of computational resources, such as memory and processes of the corresponding storage system host 140A-N. As such, storage system hosts 140A-N represent storage hardware and/or storage servers required to store database data. Storage 144A-N within storage system hosts 140A-N represent any type of storage, including one or more of volatile and non-volatile storage, e.g., random access memory (RAM), one or more hard disks, main memory, etc.

One or more of the functions attributed to processes running on server devices 110 and 120, as described herein, may be performed by services on other server devices that are communicatively coupled. Furthermore, any of the functionality attributed to database server instances 112 and 122, storage manager instances 114 and 124, and storage servers 142A-N herein may be performed by any other logical entity of network arrangement 100, according to one or more embodiments. Server devices 110 and 120 may be configured with other mechanisms, processes and functionalities, depending upon a particular implementation. Also, example network arrangement 100 may include other devices, including client devices, server devices, storage devices, networks, and display devices, according to one or more embodiments.

In an embodiment, each of the processes and/or functionality described in connection with database server instances 112 and 122, storage manager instances 114 and 124, and/or storage servers 142A-N are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Automatic Storage Management System

Server devices 110 and 120 are configured with database server instances 112 and 122, which are clients of storage servers 142A-N. For example, database server instances 112 and 122 send storage server requests to storage servers 142A-N.

Server devices 110 and 120 are also configured with storage manager instances 114 and 124, respectively. Storage manager instances 114 and 124 implement a storage management system for storage system hosts 140A-140N within storage system 140. One example of storage manager instances 114 and 124 is the Oracle Automatic Storage Management, which acts as a cluster volume manager and file system used to manage Oracle Exadata storage system resources. (information Oracle Automatic Storage Management is found in the "Automatic Storage Management Administrator's Guide", in the Oracle Database Online Documentation 11 g Release 2 (11.2) documentation, found at the time of writing this document as "asmcon.htm" at "docs.oracle.com/cd/E11882_01/server.112/e18951", the contents of which are incorporated by reference as if fully set forth herein.) Alternatively, one or more techniques described herein may be practiced without any specialized storage manager instance in server devices 110 and 120.

Collectively, storage manager instances 114 and 124 and storage servers 142A-N within storage system 140 implement an automatic storage management system (ASMS) that automatically rebalances data from cell to cell, and manages the data within storage 144A-N.

According to one or more embodiments, storage system 140 is a disk group that storage manager instances 114 and 124 use to store data files for databases being managed by one or both of database server instances 112 and 122. (More information about an example storage system is found in "Oracle Grid Infrastructure for a Standalone Server", Oracle Database Installation Guide, Oracle Database Online Documentation 11 g Release 2 (11.2), which is found at "oraclerestart.htm" in docs.oracle.com/cd/E11882_01/install.112/e47689, the entire contents of which are incorporated by reference as if fully set forth herein.)

The ASMS ensures that data is stored evenly across storage system hosts 140A-N. Furthermore, the ASMS ensures that replication of the data conforms to replication requirements. Based on replication requirements, storage manager instances 114 and 124 initiates the required number of physical replicas within storage system hosts 140A-N, and, if a particular physical replica is compromised, causes automatic creation of a new replacement physical replica within storage system hosts 140A-N. Storage servers 142A-N receive instructions from storage manager instances 114 and 124 for data management tasks and storage servers 142A-N perform these tasks. As such, the data stored in storage system 140 is manipulated locally by storage servers 142A-N.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
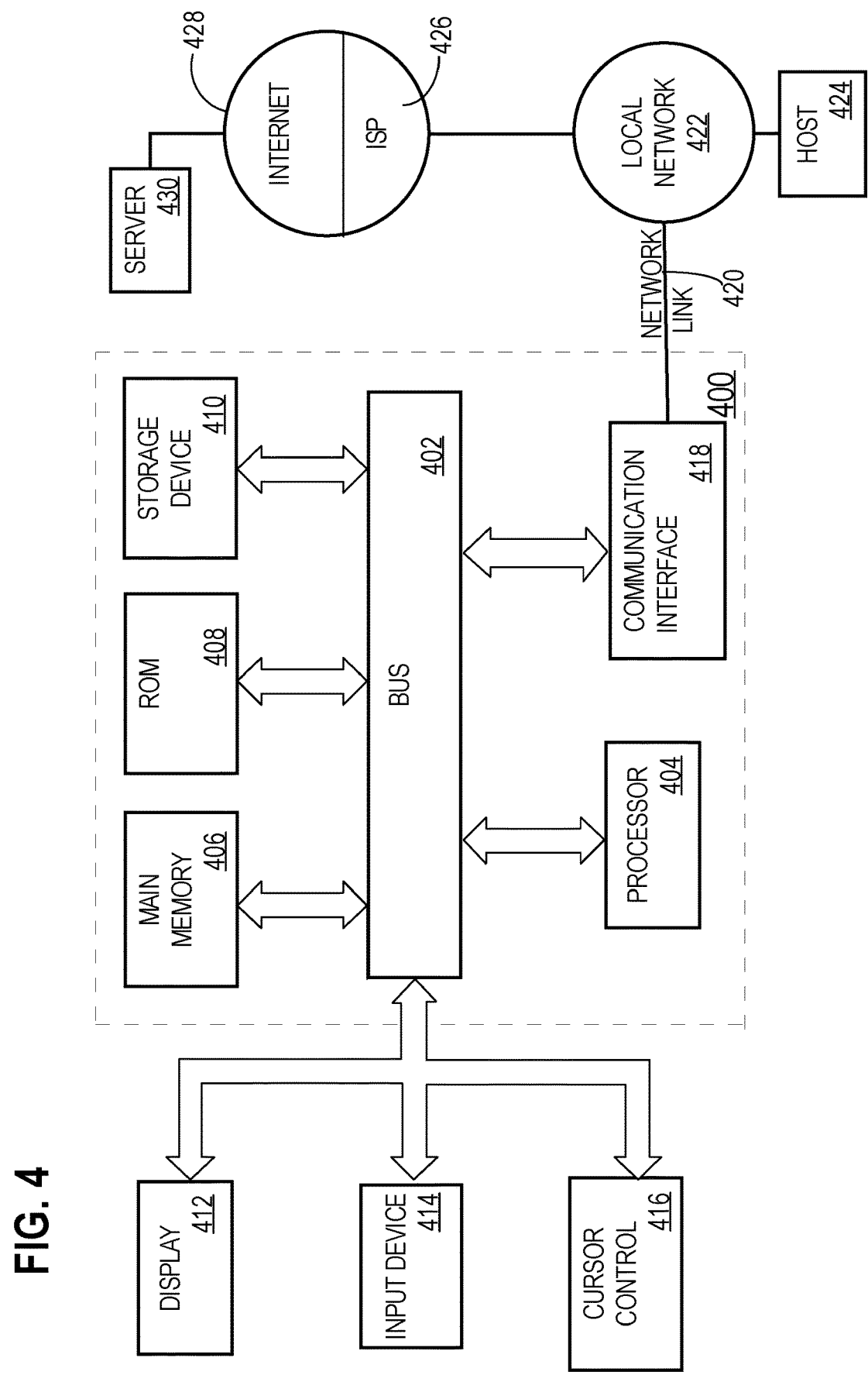
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining a database on persistent storage of a storage device;
   maintaining one or more derived caches in memory of the storage device;
   wherein a particular derived cache, of the one or more derived caches, includes information:
      derived from a unit of data, from the database, that is stored persistently in a particular region of the persistent storage, and
      that is accessed to compute one or more values for queries;
   wherein the storage device is configured to compute the one or more values for the queries from values stored in the unit of data;
   wherein the unit of data is in a different format from the particular derived cache;
   determining to copy the unit of data, that is stored in the particular region of the persistent storage, to a second storage device;
   in response to determining to copy the unit of data, that is stored in the particular region of the persistent storage, to the second storage device:
      copying the unit of data, that is stored in the particular region of the persistent storage, to the second storage device, and
      copying the particular derived cache to the second storage device;
   wherein the copy of the unit of data is in a different format from the copy of the particular derived cache; and
   accessing said particular derived cache at the second storage device to compute second one or more values for a particular query;
   wherein the second storage device is configured to compute the second one or more values for the particular query from values stored in the copy of the unit of data;
   wherein the method is performed by one or more computing devices.

2. The computer-executed method of claim 1, wherein the particular derived cache is a storage index.

3. The computer-executed method of claim 1, wherein the particular derived cache is a data summary that describes aspects of data from the particular region of the persistent storage.

4. The computer-executed method of claim 1, wherein the particular derived cache is a columnar cache.

5. The computer-executed method of claim 1, wherein:
   data stored in the particular region of the persistent storage is stored in a first format;
   the particular derived cache comprises data, from the particular region of the persistent storage, that is stored in a second format; and
   the first format is different than the second format.

6. The computer-executed method of claim 1, wherein:
   copying the particular derived cache to the second storage device produces a copy of the particular derived cache that is stored on the second storage device; and
   accessing said particular derived cache at the second storage device to compute the second one or more values for the particular query comprises accessing the copy of the particular derived cache to compute the second one or more values.

7. The computer-executed method of claim 1, wherein:
   copying the particular derived cache to the second storage device produces a copy of the particular derived cache that is stored on the second storage device;
   the method further comprises, after copying the particular derived cache to the second storage device, associating the copy of the particular derived cache with metadata indicating a location, of the copy of the unit of data, within the second storage device.

8. One or more non-transitory computer-readable media storing instructions that, when executed by one or more processors, cause:
   maintaining a database on persistent storage of a storage device;
   maintaining one or more derived caches in memory of the storage device;
   wherein a particular derived cache, of the one or more derived caches, includes information:
      derived from a unit of data, from the database, that is stored persistently in a particular region of the persistent storage, and
      that is accessed to compute one or more values for queries;
   wherein the storage device is configured to compute the one or more values for the queries from values stored in the unit of data;
   wherein the unit of data is in a different format from the particular derived cache;

determining to copy the unit of data, that is stored in the particular region of the persistent storage, to a second storage device;

in response to determining to copy the unit of data, that is stored in the particular region of the persistent storage, to the second storage device:

copying the unit of data, that is stored in the particular region of the persistent storage, to the second storage device, and copying the particular derived cache to the second storage device;

wherein the copy of the unit of data is in a different format from the copy of the particular derived cache; and accessing said particular derived cache at the second storage device to compute second one or more values for a particular query;

wherein the second storage device is configured to compute the second one or more values for the particular query from values stored in the copy of the unit of data.

9. The one or more non-transitory computer-readable media of claim 8, wherein the particular derived cache is a storage index.

10. The one or more non-transitory computer-readable media of claim 8, wherein the particular derived cache is a data summary that describes aspects of data from the particular region of the persistent storage.

11. The one or more non-transitory computer-readable media of claim 8, wherein the particular derived cache is a columnar cache.

12. The one or more non-transitory computer-readable media of claim 8, wherein:

data stored in the particular region of the persistent storage is stored in a first format;

the particular derived cache comprises data, from the particular region of the persistent storage, that is stored in a second format; and the first format is different than the second format.

13. The one or more non-transitory computer-readable media of claim 8, wherein:

copying the particular derived cache to the second storage device produces a copy of the particular derived cache that is stored on the second storage device; and accessing said particular derived cache at the second storage device to compute the second one or more values for the particular query comprises accessing the copy of the particular derived cache to compute the second one or more values.

14. The one or more non-transitory computer-readable media of claim 8, wherein:

copying the particular derived cache to the second storage device produces a copy of the particular derived cache that is stored on the second storage device;

instructions further comprise instructions that, when executed by one or more processors, cause, after copying the particular derived cache to the second storage device, associating the copy of the particular derived cache with metadata indicating a location, of the copy of the unit of data, within the second storage device.

\* \* \* \* \*

UNITED STATES PATENT AND TRADEMARK OFFICE
CERTIFICATE OF CORRECTION

PATENT NO. : 10,642,837 B2  
APPLICATION NO. : 15/410496  
DATED : May 5, 2020  
INVENTOR(S) : Umamageswaran et al.

Page 1 of 1

It is certified that error appears in the above-identified patent and that said Letters Patent is hereby corrected as shown below:

On the Title Page

On page 2, Column 1, item (56) under U.S. Patent Documents, Line 57, delete "7,233,982" and insert -- 7,233,952 --, therefor.

On page 2, Column 2, item (56) under U.S. Patent Documents, Line 73, delete "Ben-Trion" and insert -- Ben-Tsion --, therefor.

On page 4, Column 1, item (56) under Other Publications, Line 38, delete "l," and insert -- 1, --, therefor.

On page 4, Column 1, item (56) under Other Publications, Line 47, delete ""Fundatmentals" and insert -- "Fundamentals --, therefor.

On page 4, Column 2, item (56) under Other Publications, Line 63, delete "Netzza" and insert -- Netezza --, therefor.

In the Specification

In Column 8, Line 45, delete "11 g" and insert -- 11g --, therefor.

In Column 8, Line 64, delete "11 g" and insert -- 11g --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*